United States Patent
Tsukahara et al.

(10) Patent No.: US 7,032,485 B2
(45) Date of Patent: Apr. 25, 2006

(54) PLATE MEMBER SHEARING APPARATUS, METHOD FOR SHEARING PLATE MEMBER, AND SHEARED PIECE OF PLATE MEMBER

(75) Inventors: Masayuki Tsukahara, Tochigi (JP); Atsuo Ohashi, Tochigi (JP)

(73) Assignee: Showa Denko K.K., Tokyo (JP)

( * ) Notice: Subject to any disclaimer, the term of this patent is extended or adjusted under 35 U.S.C. 154(b) by 191 days.

(21) Appl. No.: 10/472,484

(22) PCT Filed: Mar. 26, 2002

(86) PCT No.: PCT/JP02/02919

§ 371 (c)(1),
(2), (4) Date: Sep. 29, 2003

(87) PCT Pub. No.: WO02/078888

PCT Pub. Date: Oct. 10, 2002

(65) Prior Publication Data

US 2004/0112189 A1    Jun. 17, 2004

(30) Foreign Application Priority Data

Mar. 29, 2001    (JP)    ............................ 2001-095551

(51) Int. Cl.
  *B26D 1/12*    (2006.01)
  *B26D 7/06*    (2006.01)
  *B23D 25/12*   (2006.01)

(52) U.S. Cl. .............. 83/13; 83/156; 83/345; 83/436.45; 83/674

(58) Field of Classification Search ............. 83/436.45, 83/156, 343, 344, 355, 674, 332, 333, 345, 83/13
See application file for complete search history.

(56) References Cited

U.S. PATENT DOCUMENTS

| | | | | |
|---|---|---|---|---|
| 5,138,923 A | * | 8/1992 | Kent et al. .................... 83/665 |
| 5,669,277 A | * | 9/1997 | Perrone ......................... 83/37 |
| 6,263,775 B1 | * | 7/2001 | Vossing et al. .......... 83/698.51 |

FOREIGN PATENT DOCUMENTS

| | | |
|---|---|---|
| JP | 43-15029 | 6/1968 |
| JP | 44-12833 | 6/1969 |
| JP | 49-56283 | 5/1974 |
| JP | 51-80081 | 7/1976 |
| JP | 128193/1977 | 9/1977 |
| JP | 31291/1979 | 3/1979 |
| JP | 7-116909 | 5/1995 |

* cited by examiner

*Primary Examiner*—Kenneth E. Peterson
*Assistant Examiner*—Isaac N. Hamilton
(74) *Attorney, Agent, or Firm*—Oblon, Spivak, McClelland, Maier & Neustadt, P.C.

(57) ABSTRACT

A shearing apparatus (1) for shearing a plate member (2) is provided with a pair of shearing rollers (20, 20) opposed with each other. These shearing rollers (20, 20) are rotated in opposite directions in a state that the plate member (2) in pinched by and between peripheral surfaces of these shearing rollers (20,20). These shearing rollers (20, 20) are provided with at least one pair of shearing portions (21, 21) to be engaged with each other to shear the plate member (2). These shearing portions (21, 21) are formed on the peripheral surfaces and extend in an axial direction of the roller (20, 20).

18 Claims, 10 Drawing Sheets

PLATE MEMBER SHEARING APPARATUS, METHOD FOR SHEARING PLATE MEMBER, AND SHEARED PIECE OF PLATE MEMBER

CROSS-REFERENCE TO RELATED APPLICATIONS

This application is a 371 of PCT/JP02/02919 filed on Mar. 26, 2002, which is a non-provisional application of U.S. Provisional Application No. 60/302,707 filed on Jul. 5, 2001, and the present application in turn claims priority to Japanese Patent Application No. 2001-95551 filed on Mar. 29, 2001, the entire contents of each of the above-noted related documents hereby being incorporated herein by reference.

TECHNICAL FIELD

The present invention relates to a plate member shearing apparatus, a method for shearing a plate member and a sheared piece of the plate member. More particularly, the present invention relates to a plate member shearing apparatus suitably used for shearing a long belt-shaped plate member into a predetermined length, a method for shearing the plate member and a sheared piece of the plate member obtained by shearing the plate member by the shearing method.

BACKGROUND ART

As a plate member shearing apparatus for shearing a long belt-shaped plate member into a predetermined length, the so-called flying shear is widely used.

As a conventional flying shear, there are two types, a single shearing type and a double shearing type. In a single shearing type flying shear, a single shearing blade shears a long plate member into a predetermined length while moving the plate member in the longitudinal direction thereof. On the other hand, in the double shearing type flying shear, a pair of shearing blades disposed at a certain distance in the traveling direction of a long plate member shear the plate member into a predetermined length while moving the plate member.

However, according to the single shearing type flying shear, since the traveling speed of the plate member fluctuates slightly, the shearing length of the plate member changes due to the fluctuations of the traveling speed. Therefore, it was difficult to shear the plate member into a predetermined length.

On the other hand, according to the double shearing type flying shear, since the plate member is sheared in a state that the tip portion thereof remains, the remaining piece (the so-called scrap) is generated at the tip portion of the plate member whenever the plate member is sheared. Accordingly, the yielding efficiency of the sheared piece is low.

Furthermore, in such a flying shear, since a forwarding operation of the plate member is performed only by an electric controller, there is a limitation in improving the shearing speed.

The present invention was made in view of the aforementioned technical background, and aims to provide a plate member shearing apparatus high in yielding efficiency of a sheared piece and capable of shearing a plate member into a uniform length, a method for shearing a plate member and a sheared piece of a plate member.

Other objects and advantages of the present invention will be apparent from the following preferred embodiments.

DISCLOSURE OF INVENTION

According to the first aspect of the present invention, a shearing apparatus for shearing a plate member includes a pair of shearing rollers for shearing a plate member into a predetermined length while passing the plate member between the pair of shearing rollers, wherein the pair of shearing rollers are rotated in opposite directions in a state that the plate member is pinched by and between the pair of shearing rollers, and wherein the pair of shearing rollers are provided with at least one pair of shearing portions to be engaged with each other to shear the plate member, the shearing portions being formed on peripheral surfaces of the pair of shearing rollers and extending in an axial direction of each of the pair of shearing rollers.

According to this flying shear, the plate member is pinched by and between the pair of shearing rollers rotating in opposite directions. Then, in this pinched state, the plate member is moved in accordance with the rotation of both the shearing rollers and then sheared into a predetermined length by the pair of shearing portions formed on the peripheral surfaces of the shearing rollers and engaged with each other.

Since the plate member is moved and sheared in accordance with the rotation of both the shearing rollers in the state that the plate member is pinched by and between both the shearing rollers, in cases where a pair of shearing portions are provided on the peripheral surfaces of the shearing rollers, the plate member is sheared into a length corresponding to the circumferential length of the shearing roller. Accordingly, the plate member is sheared into a uniform length. On the other hand, in cases where plural pairs of shearing portions are provided on the peripheral surfaces of the shearing rollers at certain circumferential intervals, the plate member is sheared into a length corresponding to the circumferential length between one of shearing portion on the peripheral surface of the shearing roller and a shearing portion adjacent to the aforementioned one of shearing portion and located in the direction opposite to the rotational direction of the shearing roller. As a result, the plate member is sheared into a uniform length.

With this shearing apparatus, the plate member can be sheared without producing a remaining piece, and therefore it is possible to increase the number of the sheared pieces to be obtained from the plate member. Furthermore, since the shearing speed of the plate member is determined by the rotation speed of the shearing rollers (namely, the circumferential speed of the shearing rollers), the shearing speed can be easily increased by increasing the rotation speed of the shearing rollers.

Furthermore, it becomes unnecessary to use a feeding apparatus for feeding the plate member to the shearing rollers, or it becomes possible to feed the plate member by a feeding apparatus which is simple in structure. As a result, the structure of the shearing apparatus can be simplified.

In cases where plural pairs of shearing portions are formed on the peripheral surfaces of the shearing rollers at certain intervals along the circumferential direction thereof, one rotation makes the plural sheared pieces. Accordingly, the plate member can be sheared efficiently, which in turn can further increase the shearing speed.

In the aforementioned shearing apparatus, it is preferable that the plate member is provided with a groove or a ridge extending in a traveling direction of the plate member on at least one of surfaces of the plate member, wherein one of the pair of shearing rollers disposed at a side of the groove or the ridge of the plate member is provided with a ridge or a groove on the peripheral surface thereof, and wherein the ridge or the groove of the one of the pair of shearing rollers extends in a circumferential direction thereof so as to be engaged with the groove or the ridge of the plate member.

In this case, the plate member is pinched by and between both the shearing rollers in the state in which the ridge or the groove formed on one side or both sides of the plate member is engaged with the groove or the ridge formed on the peripheral surfaces of the shearing rollers. Then, in this pinched state, the plate member is moved in accordance with the rotation of the shearing rollers and sheared by the shearing portions. Accordingly, with this flying shear, even if a plate member has a groove or a ridge formed on one side or both sides thereof, the plate member can be pinched by and between the shearing rollers without causing any deformation of the groove or the ridge. Accordingly, it is possible to assuredly prevent the slippage of the plate member which may be caused at the peripheral surfaces of the shearing rollers, and therefore the plate member can be assuredly sheared into a uniform length.

Furthermore, it is preferable that the ridge or the groove of the one of the pair of shearing rollers extends to a shearing face of the shearing portion. In this case, deformation of the shearing portions which may be caused at the time of shearing a plate member can be prevented or suppressed. As a result, the plate member can be sheared without causing almost any deformation of the shearing portions.

According to the aforementioned shearing apparatus, it is possible to assuredly shear a plate member having a thickness of 0.15 mm or less.

In the shearing apparatus, it is preferable that at least one of the pair of shearing rollers is provided with a stepped portion extending in the axial direction on the peripheral surface, and wherein a rising face and a protruded edge of the stepped portion constitute a shearing face and a shearing edge, respectively. In this case, it becomes unnecessary to attach a cutter as the shearing portion on the peripheral surfaces of the shearing rollers, and therefore the structure of the shearing rollers can be simplified. Accordingly, it becomes possible to easily manufacture the shearing rollers at low cost.

In the aforementioned shearing apparatus, it is preferable that at least one of the pair of shearing rollers is constituted by a plurality of divided members assembled with each other, each of the plurality of divided members having a dividing face in alignment with a shearing face of the shearing portion. In this case, the structure of the shearing rollers can be further simplified, and it becomes possible to manufacture the shearing rollers more easily and cheaply. Although means for fixing the divided members is not limited to specific means, it is preferable to use fastening members such as a screw or a bolt.

In the aforementioned shearing apparatus, it is preferable that at least a portion of a shearing face near a shearing edge of the shearing portion of at least one of the pair of shearing rollers is curved toward the shearing edge. In this case, the clearance between both shearing portions can be decreased at the time of the engagement of the shearing portions. Accordingly, burrs of the sheared portion which may be generated at the time of shearing the plate member can be prevented or suppressed, which enables to obtain a sheared piece with almost no burr at the sheared portion. It is especially preferable that the aforementioned portion of the shearing face is formed roundly along an involute curve or a parainvolute curve.

In the aforementioned shearing apparatus, it is preferable that a feeding apparatus for feeding the plate member to the shearing rollers is disposed at an inlet side of the pair of shearing rollers. In this case, it becomes possible to automatically feed the plate member between the shearing rollers, resulting in improved shearing operation efficiency of the plate member.

In the aforementioned shearing apparatus, it is preferable that a forwarding apparatus for forwarding a sheared piece obtained by shearing the plate member is disposed at an outlet side of the pair of shearing rollers. In this case, it becomes possible to automatically discharge the sheared piece sheared by the shearing rollers. As a result, the shearing operation efficiency of the plate member can be improved.

In the aforementioned shearing apparatus, it is preferable that a transferring apparatus for transferring a sheared piece obtained by shearing the plate member to a stacker is disposed at an outlet side of the pair of shearing rollers. In this case, the sheared piece sheared by the shearing rollers can be sent to the stacker efficiently.

The second aspect of the present invention is directed to a sheared plate member sheared by the shearing apparatus according to the first aspect of the present invention. According to the second aspect of the present invention, it becomes possible to assuredly obtain a sheared piece having a predetermined length.

According to the third aspect of the present invention, a method of shearing a plate member includes the steps of preparing a shearing apparatus equipped with a pair of shearing rollers, the pair of shearing rollers having at least one pair of shearing portions to be engaged with each other, the shearing portions being formed on peripheral surfaces of the shearing rollers and extending in an axial direction of the shearing rollers, and shearing the plate member by engaging the pair of shearing portions in a state that the plate member is pinched by and between the shearing rollers rotating in opposite directions.

According to this method of shearing a plate member, the plate member can be sheared into a uniform length. Furthermore, the shearing speed can be increased easily by increasing the rotation speed of the shearing rollers, and the yielding efficiency of the sheared piece can be also increased since the plate member is sheared without causing any remaining piece. Furthermore, in cases where the shearing apparatus is provided with plural pairs of shearing portions at certain intervals in the circumferential direction, the plate member can be sheared efficiently, which enables to further increase the shearing speed.

In the aforementioned method of shearing a plate member, it is preferable that the plate member is provided with a groove or a ridge extending in a traveling direction of the plate member on at least one of surfaces of the plate member, wherein one of the pair of shearing rollers disposed at a side of the groove or the ridge of the plate member is provided with a ridge or a groove on the peripheral surface, and wherein the ridge or the groove of the one of the pair of shearing rollers extends in a circumferential direction thereof so as to be engaged with the groove or the ridge of the plate, member.

In this case, even if a plate member has a groove or a ridge on one side or both sides thereof, the plate member can be pinched by and between both the shearing rollers without causing any deformation of the groove or the ridge. Accordingly, it is possible to assuredly prevent the slippage of the plate member which may be caused at the peripheral surfaces of the shearing rollers, and therefore the plate member can be assuredly sheared into a uniform length.

In the aforementioned method of shearing a plate member, it is preferable that the ridge or the groove of the one of the pair of shearing rollers extends to a shearing face of the shearing portion. In this case, it becomes possible to shear the plate member without causing any deformation of the shearing portion.

According to the aforementioned shearing method, even if the plate member has a thickness of 0.15 mm or less, it is possible to shear the plate member assuredly.

In the aforementioned shearing method, it is preferable that at least one of the pair of shearing rollers is provided with a stepped portion extending in an axial direction thereof on the peripheral surface, and wherein a rising face and a protruded edge of the stepped portion constitute a shearing face and a shearing edge, respectively. In this case, the structure of the shearing rollers can be simplified, and therefore it becomes possible to manufacture the shearing rollers easily and economically.

In the aforementioned shearing method, it is preferable that at least one of the pair of shearing rollers is constituted by a plurality of divided members assembled with each other, each of the plurality of divided members having a dividing face in alignment with a shearing face of the shearing portion. In this case, the structure of the shearing rollers can be further simplified, and therefore it becomes possible to manufacture the shearing rollers more easily and economically.

In the aforementioned shearing method, it is preferable that at least a portion of a shearing face near a shearing edge of the shearing portion of at least one of the pair of shearing rollers is curved toward the shearing edge. In this case, it becomes possible to prevent or suppress the generation of burrs which may be generated at the time of shearing a plate member.

In the aforementioned shearing method, it is preferable that the plate member is fed to the shearing rollers by a feeding apparatus disposed at an inlet side of the pair of shearing rollers. In this case, it becomes possible to automatically feed the plate member to the shearing rollers, and therefore the shearing operation efficiency of the plate member can be improved.

In the aforementioned shearing method, it is preferable that a sheared piece is forwarded by a forwarding apparatus disposed at an outlet side of the pair of shearing rollers. In this case, it becomes possible to automatically discharge the sheared piece sheared by the shearing rollers. As a result, the shearing operation efficiency of the plate member can be improved.

In the aforementioned shearing method, it is preferable that a sheared piece is transferred to a stacker by a transferring apparatus disposed at an outlet side of the pair of shearing rollers. In this case, it becomes possible to forward the sheared piece sheared by the shearing rollers to the stacker efficiently.

The fourth aspect of the present invention is directed to a sheared piece obtained by shearing a plate member according to the third aspect of the present invention. According to the fourth aspect of the present invention, a sheared piece having a predetermined length can be obtained.

BEST MODE FOR CARRYING OUT THE INVENTION

The present invention will be detailed with reference to the attached drawings.

Figure 1:
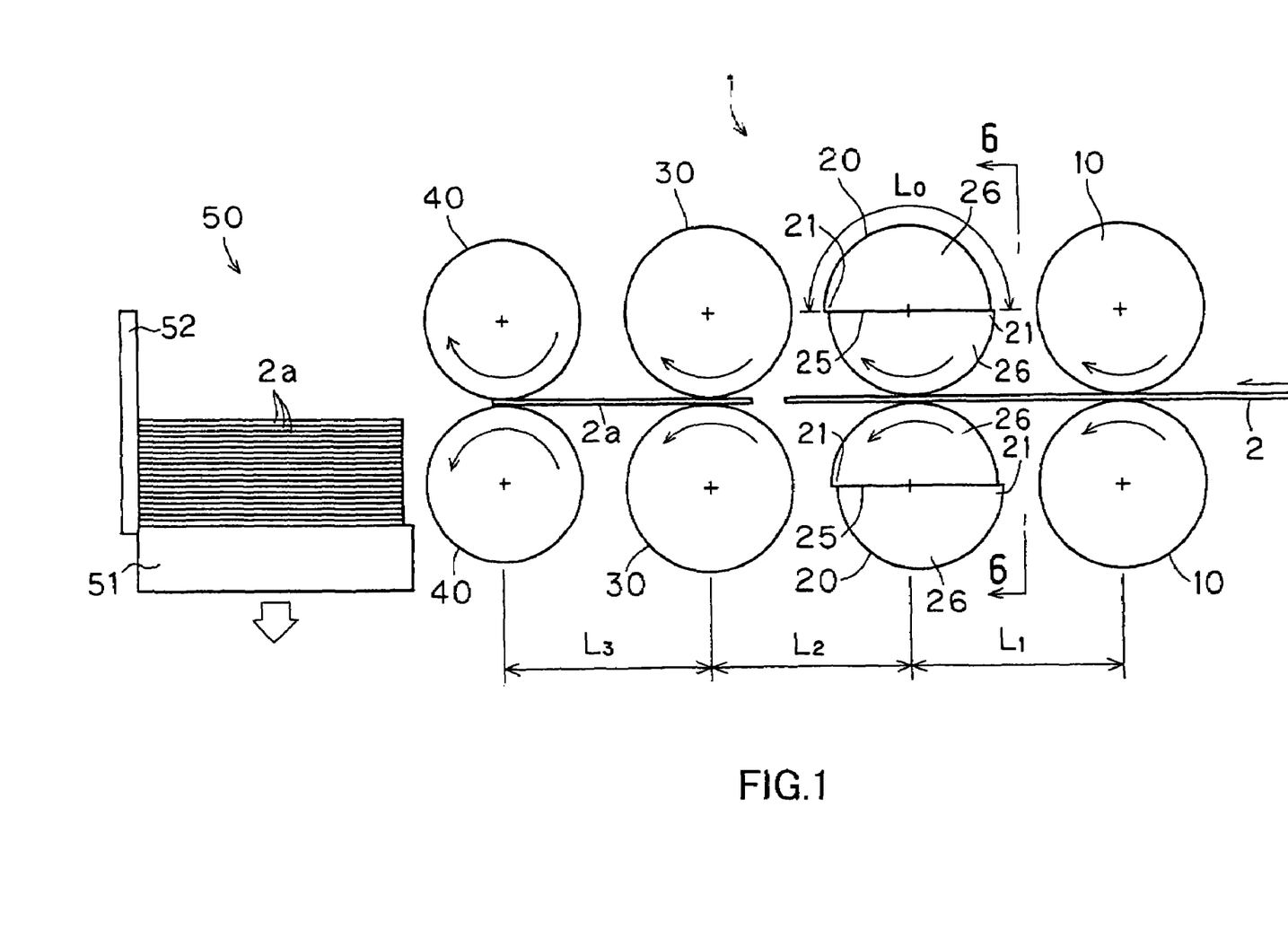
FIG. 1 is a side view showing a shearing apparatus according to one embodiment of the present invention in a state that a plate member is pinched by and between a pair of shearing rollers.

In FIG. 1, the reference numeral 1 denotes an apparatus for shearing a plate member according to an embodiment, 2 denotes a plate member and 50 denotes a stacker. The plate member 2 is a metal member, i.e., an aluminum or its alloy member. The sheared piece 2a obtained by shearing the plate member 2 with the shearing apparatus 1 will be used as an inner fin. This inner fin is disposed in a heat exchanging tube of a heat exchanger such as an evaporator for use in car air-conditioners. This plate member 2 is a long belt-shaped member having a constant width. The width is, for example, 20 to 70 mm. Furthermore, the thickness of this plate member 2 is 0.15 mm or less. Accordingly, this plate member 2 is an extremely thin member.

Figure 5:
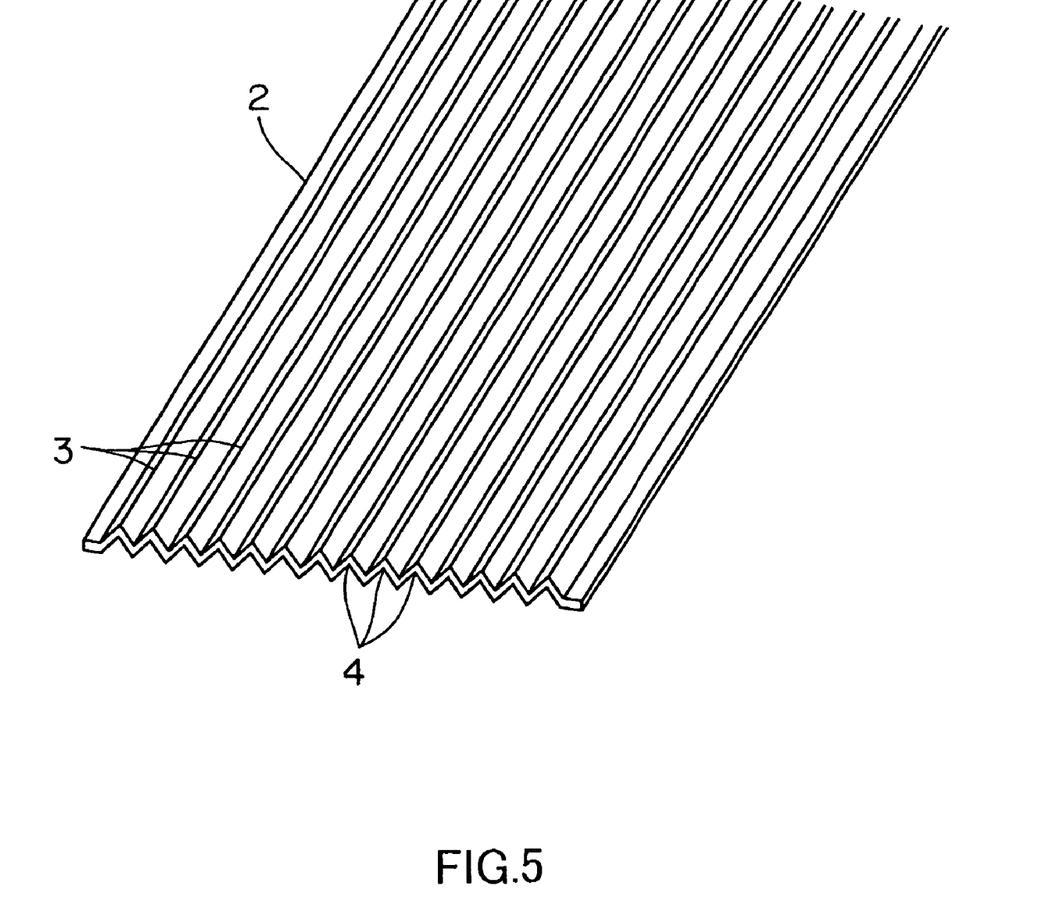
FIG. 5 is a perspective view of the plate member.

This plate member 2 is moved in the longitudinal direction thereof to the shearing apparatus 1 with nearly horizontal position. This plate member 2 has a wavy cross-section as shown in FIG. 5. On the upper surface of this plate member 2, a plurality of triangular cross-sectional ridges 3 each extending in the traveling direction (namely, in the longitudinal direction of the plate member) are formed in parallel with each other. On the lower surface of this plate member 2, a plurality of triangular cross-sectional grooves 4 each extending in the traveling direction (namely, in the longitudinal direction of the plate member) are formed in parallel with each other. This plate member 2 is formed to have the aforementioned cross-sectional shape by the forming apparatus (not shown) disposed at the inlet side of the shearing apparatus 1.

Figure 2:
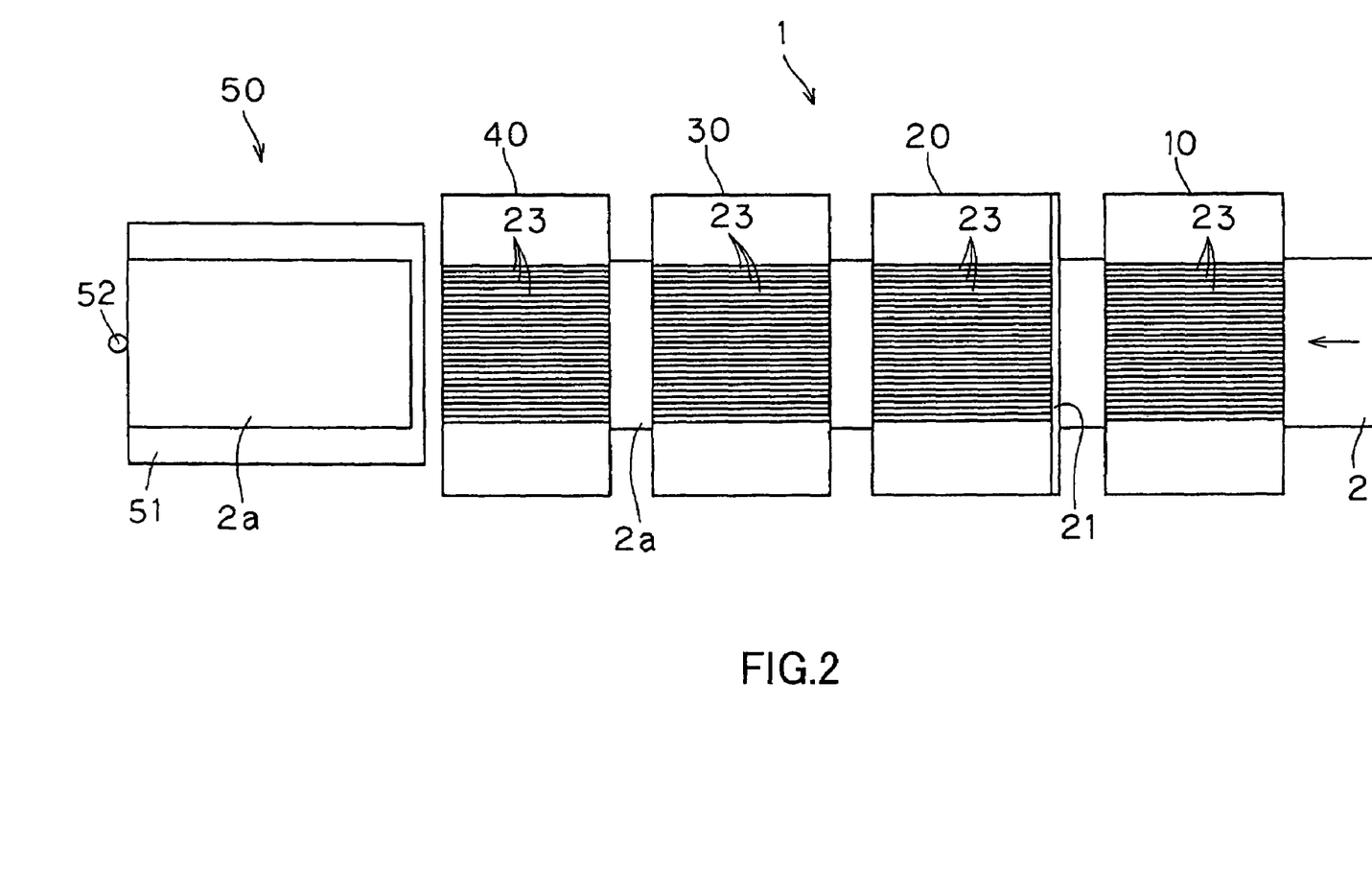
FIG. 2 is a plane view showing the shearing apparatus in the state shown in FIG. 1.

The shearing apparatus 1 is a flying shear for shearing the aforementioned plate member 2 into a predetermined length while forwarding the plate member 2 in the longitudinal direction thereof, as shown in FIGS. 1 and 2.

This shearing apparatus 1 is equipped with a pair of upper and lower opposed shearing rollers 20 and 20 each having a nearly circular cross-section and opposed with each other. These shearing rollers 20 and 20, i.e., the upper shearing roller 20 and the lower shearing roller 20 have the same diameter.

Furthermore, in this shearing apparatus 1, at the inlet side of both the shearing rollers 20 and 20, a pair of upper and lower feeding rollers 10 and 10 opposed each other as a feeding apparatus for feeding a plate member 2 to the shearing rollers 20 and 20 are disposed apart from the shearing rollers 20 and 20 by a predetermined distance L1. In both the feeding rollers 10 and 10, the upper feeding roller 10 and the lower feeding roller 10 have the same diameter which is the same as the diameter of the shearing roller 20 and 20.

Furthermore, at the outlet side of both the shearing rollers 20 and 20, a pair of upper and lower forwarding rollers 30 and 30 opposed each other as a forwarding apparatus for forwarding a sheared piece 2a are disposed apart from the shearing rollers 20 and 20 by a predetermined distance L2. In both the forwarding rollers 30 and 30, the upper forwarding roller 30 and the lower forwarding roller 30 have the same diameter which is the same as the diameter of the shearing roller 20 and 20.

Furthermore, at the outlet side of both the forwarding rollers 30 and 30, a pair of upper and lower transferring rollers 40 and 40 opposed each other as a transferring apparatus for transferring a sheared piece 2a to a stacker 50 are disposed apart from the forwarding rollers 30 and 30 by a predetermined distance L3. In both the transferring rollers 40 and 40, the upper transferring roller 40 and the lower transferring roller 40 have the same diameter.

The stacker 50 is provided with a platform 51 on which sheared pieces 2a are stacked and a columnar stopper 52 which stops a transferring movement of the sheared piece 2a. The platform 51 is arranged approximately horizontally and moves downward in accordance with the number of piled sheared pieces 2a. The stopper 52 is disposed approximately vertically at the front side of the platform 51 relative to the transferring direction of the sheared piece 2a.

In this shearing apparatus 1, both the shearing rollers 20 and 20 are connected to a driving apparatus (not shown), and are rotated in the opposite directions by the driving apparatus. The feeding rollers 10 and 10 are also connected to the aforementioned driving apparatus, and are rotated in the opposite directions at the same circumferential speed as the circumferential speed of the shearing rollers 20 and 20. Furthermore, the forwarding rollers 30 and 30 are also connected to the aforementioned driving apparatus, and are rotated in the opposite directions at the same circumferential speed as the circumferential speed of the shearing rollers 20 and 20. On the other hand, both the transferring rollers 40 and 40 are connected to the aforementioned driving apparatus, and are rotated in the opposite directions by the driving apparatus. The transferring rollers 40 and 40 may be connected to a driving apparatus other than the aforementioned driving apparatus. The transferring roller 40 and 40 are rotated at the same circumferential speed as the circumferential speed of the shearing rollers 20 and 20. The transferring rollers 40 and 40 may be rotated at a circumferential speed higher than the circumferential speed of the shearing rollers 20 and 20 by 50%. By setting the circumferential speed as mentioned above, the sheared pieces 2a can be stacked neatly in the stacker 50.

Next, the structure of the shearing rollers 20 and 20 will be explained with reference to FIGS. 7 to 10.

Figure 7:
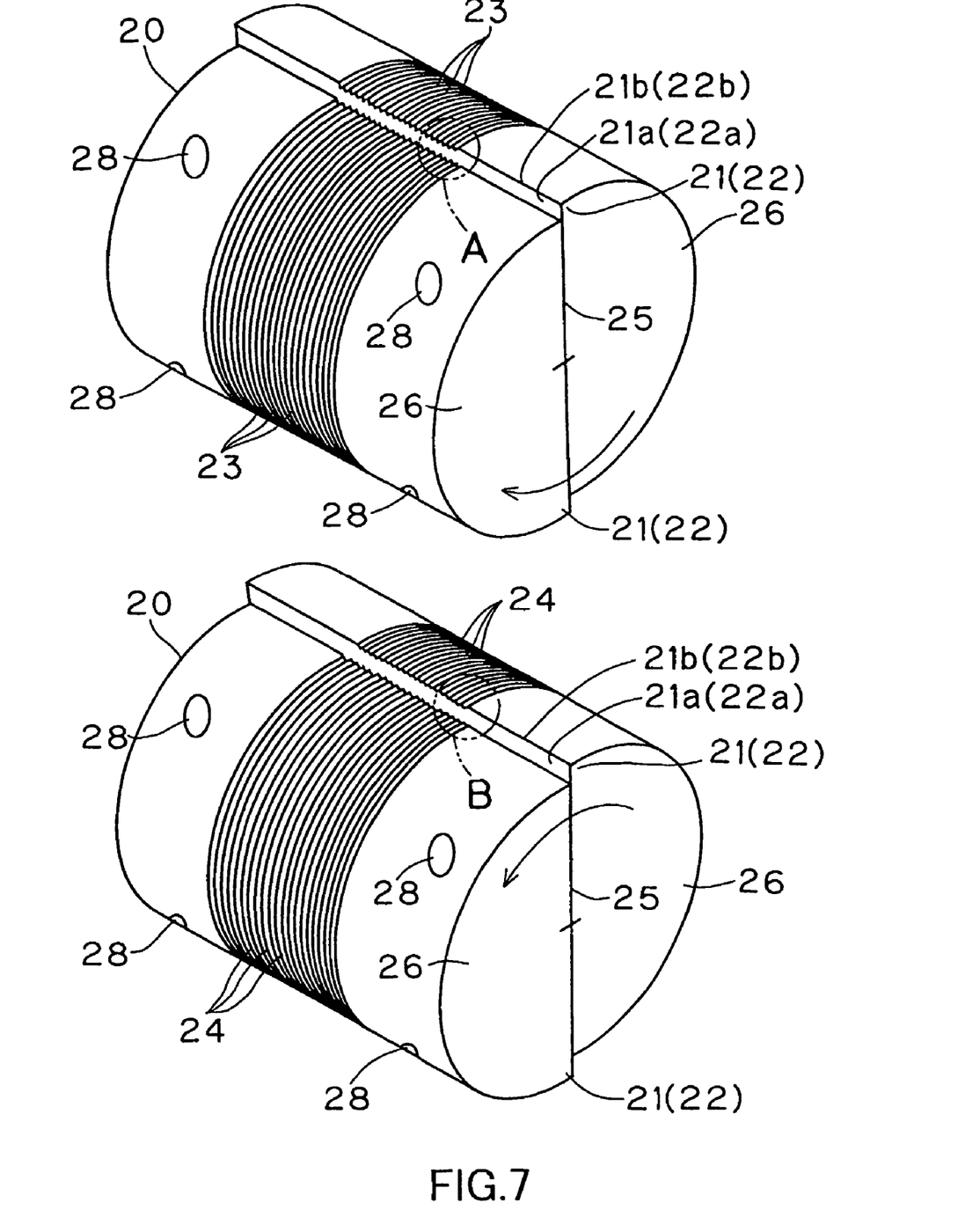
FIG. 7 is a perspective view showing the pair of shearing rollers in a detached state.
Figure 10:
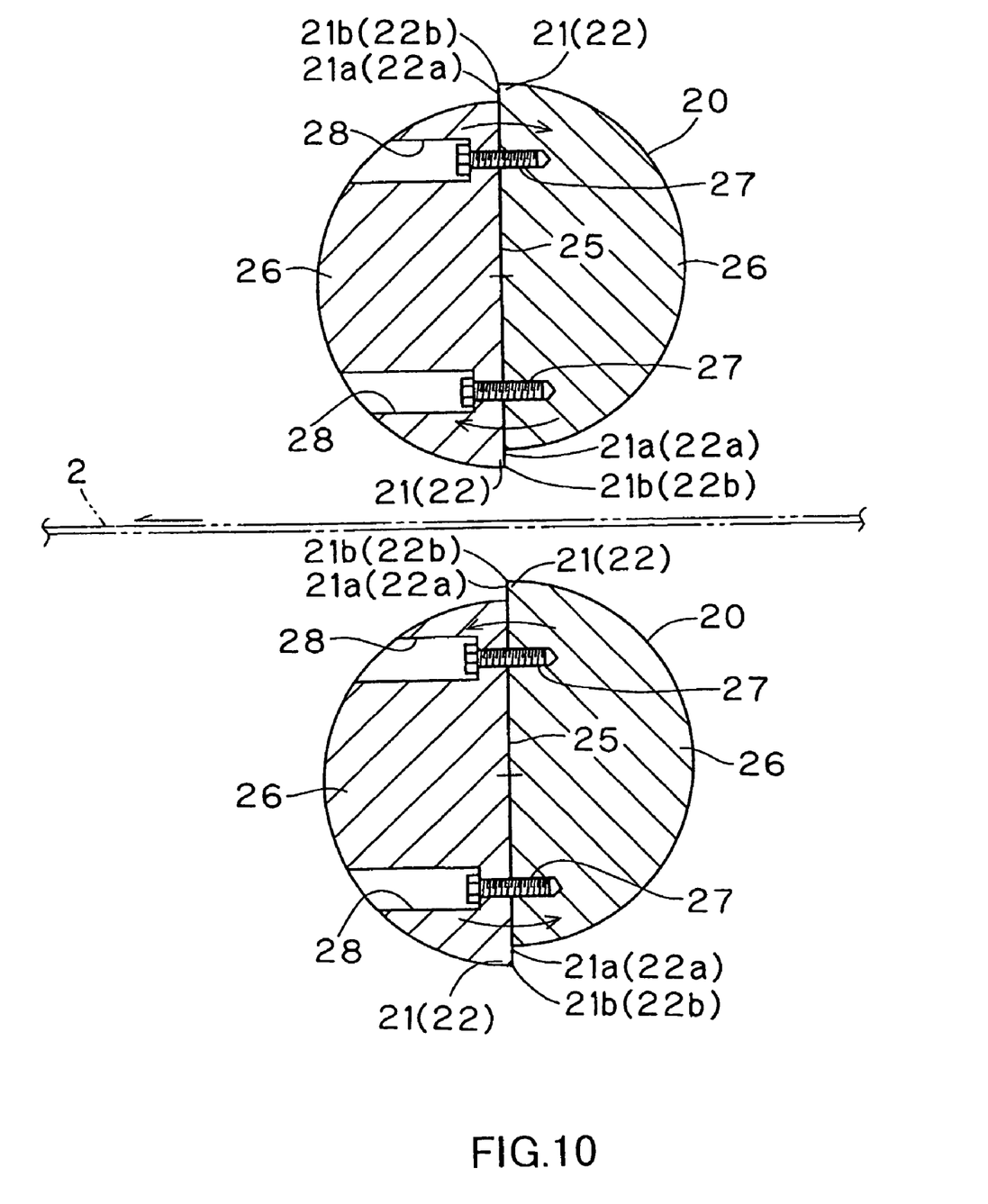
FIG. 10 is a cross-sectional view showing the pair of shearing rollers in a detached state.

On the peripheral surfaces of the pair of the shearing rollers 20 and 20, plural pairs of upper and lower shearing portions 21 and 21 each extending in the axial direction are provided so as to be engaged with each other at certain circumferential intervals. In this embodiment, two pairs of the shearing portions 21 and 21 are provided. The pair of shearing portions 21 and 21 are engaged with each other for shearing the plate member 2.

In each shearing roller 20, provided that one of two shearing portions 21 and 21 is referred to as a first shearing portion 21 and the other a second shearing portion 21, the circumferential length from the first shearing portion 21 to the second shearing portion 21 in the rotational direction and the circumferential length from the second shearing portion 21 to the first shearing portion 21 in the rotational direction are the same. The circumferential length is represented by L0 (see FIG. 1).

The reference numerals 21a and 21b denote a shearing face and a shearing edge of the shearing portion 21, respectively.

Each shearing rollers 20 and 20 are assembled as follows.

As shown in FIG. 10, each shearing roller 20 is formed by equally dividing a columnar member having a true round cross-section along a plane parallel to the axis into plural pieces, and then integrally assembled and fixed by fastening members 27 in a state in which the plural pieces are shifted in the radial direction thereof. In this embodiment, the columnar member is divided into two pieces. The structure of each shearing roller 20 will be explained concretely. Each shearing roller 20 is divided into two pieces along a plane which coincides with the shearing face 21a of the first shearing portion 21 and the shearing face 21a of the second shearing portion 21 and is parallel to the axial direction. These two divided pieces 26 and 26 are assembled and fixed with each other by the fastening members 27 in a state in which two divided pieces 26 and 26 are shifted each other in the radial direction thereof. In this embodiment, screws are used as the fastening members 27. In FIG. 10, the reference numeral 28 denotes a screw insertion hole formed in the periphery of the divided piece 26 at the longitudinal end portion thereof. In the state that the two divided pieces 26 and 26 are assembled as mentioned above, two stepped portion 22 and 22 protruded radially outwardly from the peripheral surface of the shearing roller 20 are formed at certain intervals in, the circumferential direction. The rising face 22a and the protruded edge 22b of each stepped portion 22 constitute the shearing face 21a and the shearing edge 21b of the shearing portion 21, respectively.

It is preferable that the level difference S (see FIG. 11) of each stepped portion 22 falls within the range of from 0.3 to 1.0 mm because of the following reasons. If the level difference S is less than 0.3 mm, it becomes difficult to shear the plate member 2. On the other hand, if the level difference S exceeds 1.0 mm, it becomes difficult to pinch the plate member 2 by and between the peripheral surfaces of the shearing rollers 20 and 20.

Figure 11:
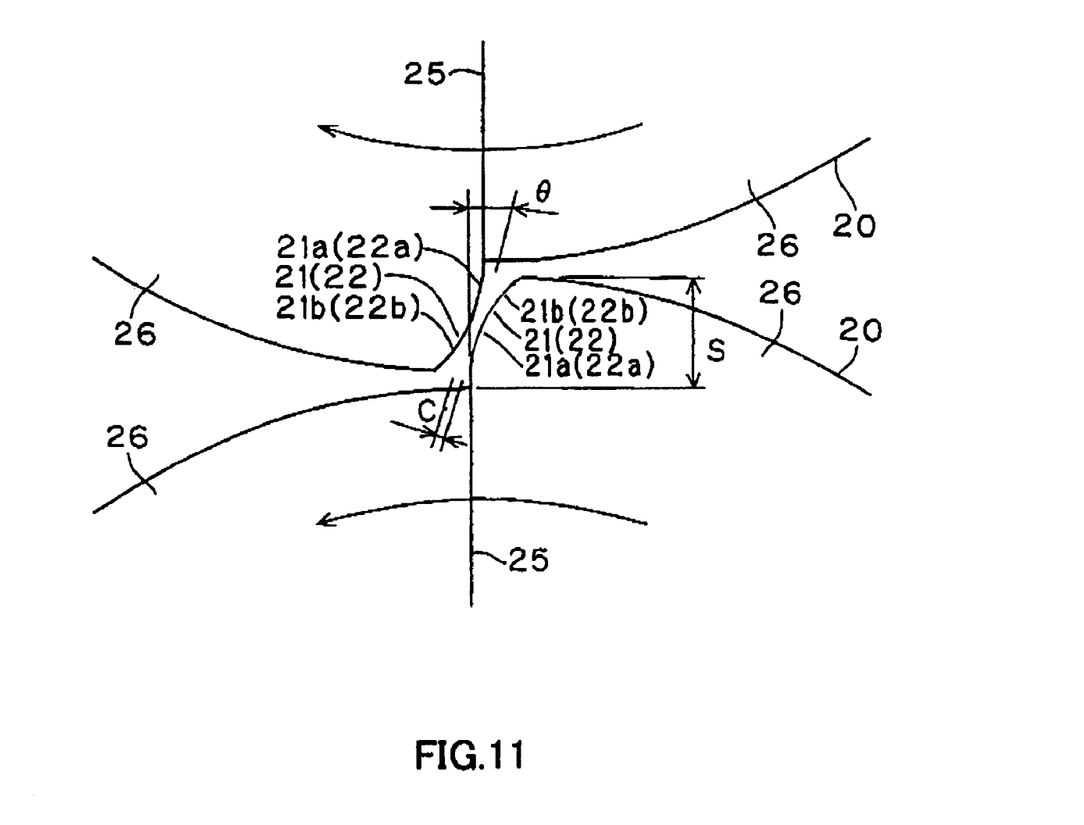
FIG. 11 is an enlarged side view of the shearing portions in a state that the pair of shearing rollers are engaged with each other.

Furthermore, as shown in FIG. 11, the portion of the shearing face 21a of the shearing portion 21 of each shearing roller 20 near the shearing edge 21b is rounded toward the shearing edge 21b along an involute curve or a parainvolute curve. Thereby, the clearance C between the shearing portions 21 and 21 can become nearly zero at the time of the engagement of the shearing portions 21 and 21. In this embodiment, the pair of shearing portions 21 and 21 are engaged in a contacted state (namely, in a zero clearance C). In FIG. 11, for the explanation purposes, the pair of shearing portions 21 and 21 are shown in a detached state. It is preferable that the inclination angle θ of the shearing face 21a relative to the normal line of the peripheral surface of the shearing roller 20 is set so as to fall within the range of from 3° to 8°.

Figure 8:
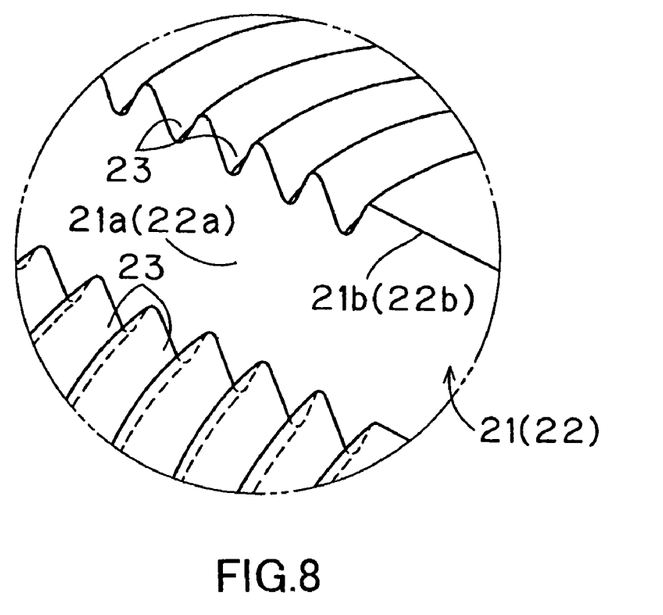
FIG. 8 is an enlarged view of the portion A shown in FIG. 7.
Figure 9:
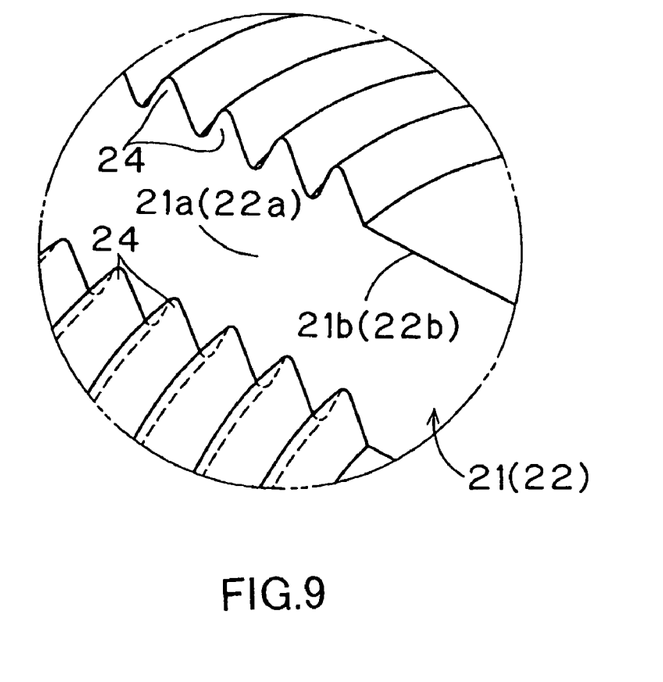
FIG. 9 is an enlarged view of the portion B shown in FIG. 8.

Furthermore, as shown in FIGS. 7 and 8, on the peripheral surfaces of the longitudinal middle portion of the upper shearing roller 20 between two shearing portions 21 and 21, a plurality of grooves 23 which extend in the circumferential direction and are to be engaged with the plurality of ridges 3 formed on the upper surface of the plate member 2 are formed along the entire area in the circumferential direction of the periphery. Accordingly, these grooves 23 extend to the shearing face 21a of the shearing portion 21. Similarly, as shown in FIGS. 7 and 9, on the peripheral surfaces of the longitudinal middle portion of the lower shearing roller 20 between two shearing portions 21 and 21, a plurality of ridges 24 which extend in the circumferential direction and are to be engaged with the plurality of grooves 4 formed on the lower surface of the plate member 2 are formed along the entire area in the circumferential direction of the periphery. Accordingly, these ridges 24 extend to the shearing face 21a of the shearing portion 21.

Furthermore, in the feeding rollers 10 and 10, and the forwarding rollers 30 and 30 and the transferring rollers 40 and 40, on the peripheral surface of each upper roller 10, 30 and 40, as shown in FIG. 2, a plurality of grooves 23 extending in the circumferential direction to be engaged with the plurality of ridges 3 formed on the upper surface of the plate member 2 are formed along the entire periphery. Similarly, on the peripheral surface of each lower roller 10, 30 and 40, a plurality of ridges 24 extending in the circumferential direction to be engaged with the plurality of grooves 4 formed on the lower surface of the plate member 2 are formed along the entire periphery.

In this shearing apparatus 1, as shown in FIG. 1, it is preferable that the distance L1 between the rotation center of the shearing roller 20 and that of the feeding roller 10 along the traveling direction of the plate member 2 falls within the range of from L0 to (L0-15) mm, more preferably from L0 to (L0-10) mm. Similarly, it is preferable that the distance L2 between the rotation center of the shearing roller 20 and that of the forwarding roller 30 along the traveling direction of the plate member 2 falls within the range of from L0 to (L0-15) mm, more preferably from L0 to (L0-10) mm. Similarly, it is preferable that the distance L3 between the rotation center of the forwarding roller 30 and that of the transferring roller 40 along the traveling direction of the plate member 2 falls within the range of from L0 to (L0-15) mm, more preferably from L0 to (L0-5) mm.

Next, the operation and the handling method of the shearing apparatus 1 will be explained.

First, the driving apparatus is activated, so that both the feeding rollers 10 and 10, both the shearing rollers 20 and 20, both the forwarding rollers 30 and 30 and both the transferring rollers 40 and 40 are rotated in the opposite directions, respectively.

Then, as shown in FIGS. 1 and 2, the longitudinal end portion of the horizontally disposed plate member 2 is introduced between the feeding rollers 10 and 10 in a state in which the ridges 3 formed on the upper surface of the plate member 2 are engaged with the grooves of the peripheral surface of the upper feeding roller 10 and the grooves 4 formed on the lower surface of the plate member 2 are engaged with the ridges of the peripheral surface of the lower feeding roller 10. As a result, the plate member 2 is pinched by and between the peripheral surfaces of the feeding rollers 10 and 10, and therefore the plate member 2 is fed to the shearing rollers 20 and 20.

Figure 3:
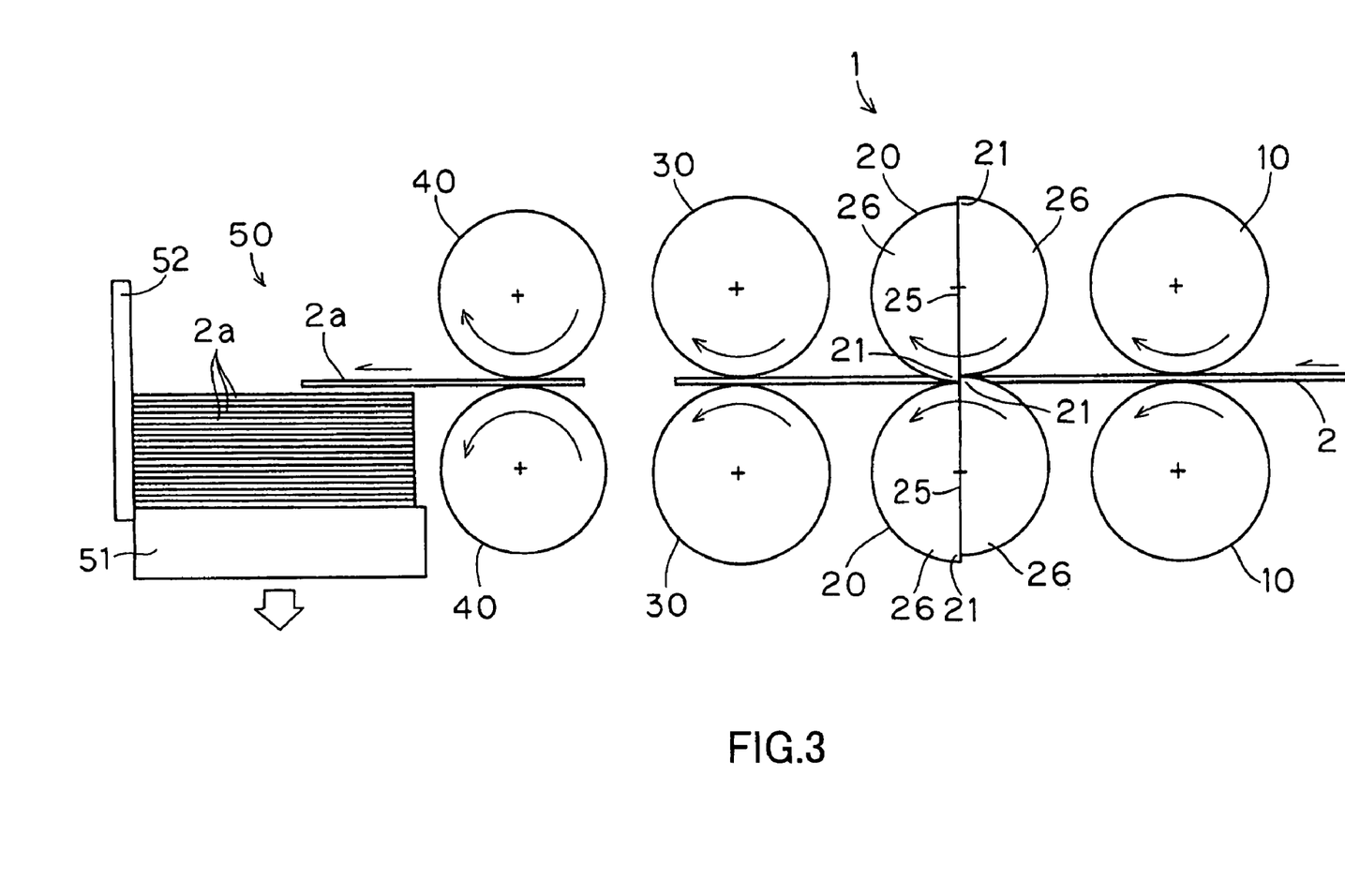
FIG. 3 is a side view showing the shearing apparatus which is shearing a plate member.
Figure 4:
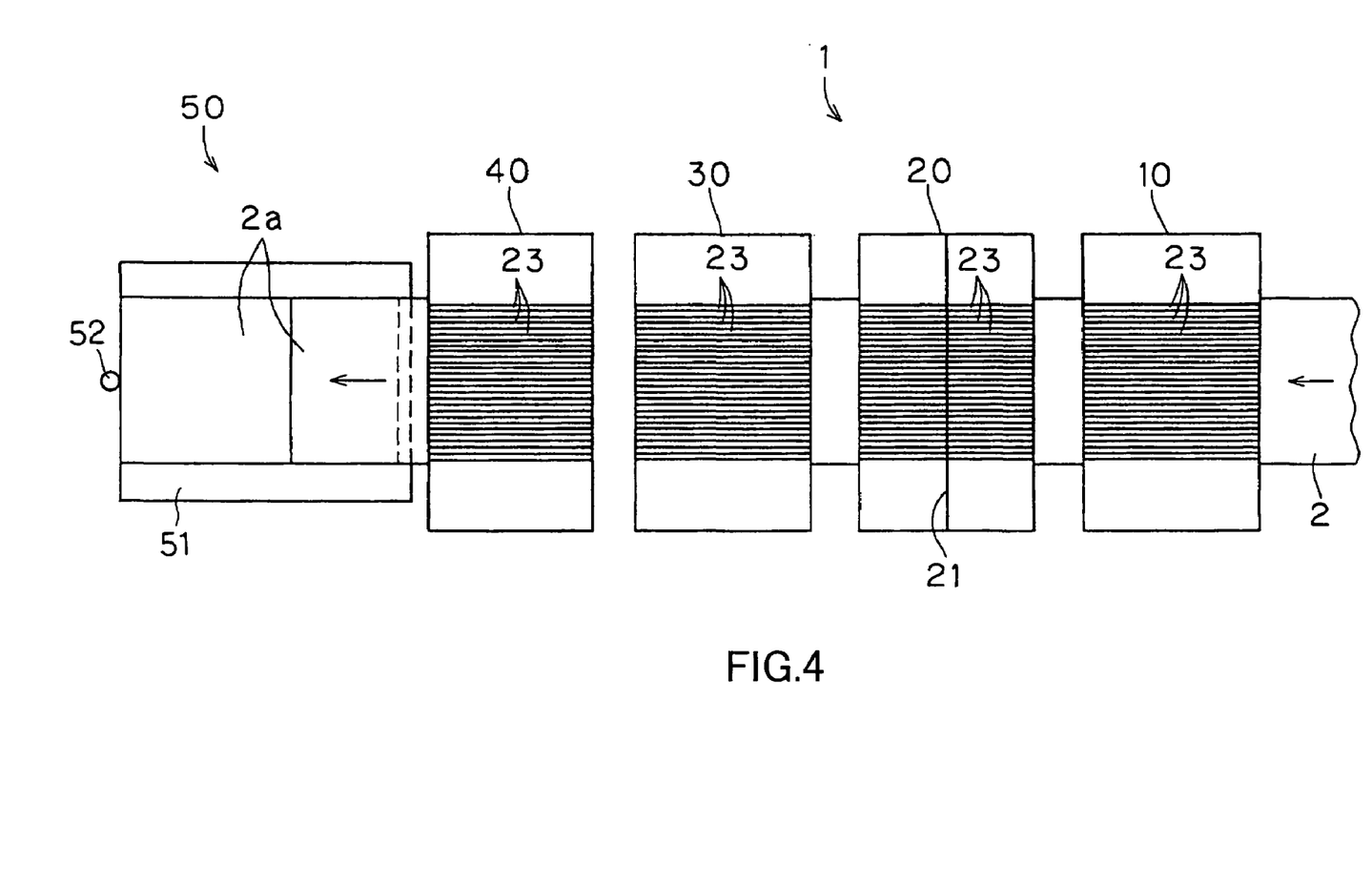
FIG. 4 is a plane view showing the shearing apparatus in the state shown in FIG. 3.
Figure 6:
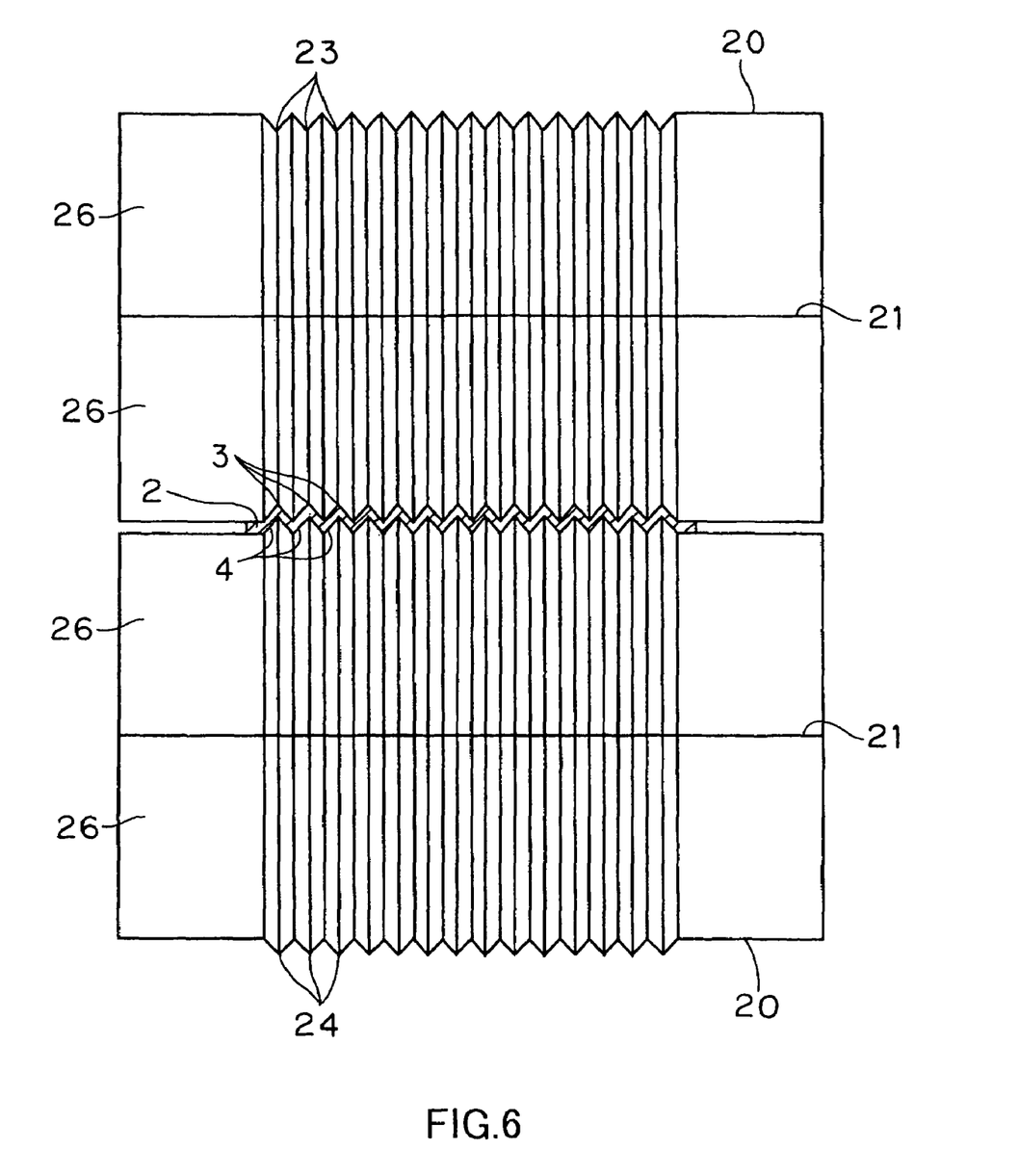
FIG. 6 is an enlarged cross-sectional view taken along the line 6—6 in FIG. 1.

As shown in FIG. 6, the plate member 2 fed in this way is introduced between the shearing rollers 20 and 20 in a state in which the ridges 3 formed on the upper surface of the plate member 2 are engaged with the grooves 23 of the peripheral surface of the upper shearing roller 20 and the grooves 4 formed on the lower surface of the plate member 2 are engaged with the ridges 24 of the peripheral surface of the lower shearing roller 20. As a result, the plate member 2 is pinched by and between the peripheral surfaces of the feeding rollers 10 and 10 and moved by the rotation driving force of the shearing rollers 20 and 20, and therefore the longitudinal end of the plate member 2 is fed to the forwarding rollers 30 and 30. Then, as shown in FIGS. 3 and 4, the plate member 2 is sheared into a predetermined length by engaging the pair of shearing portions 21 and 21. The obtained sheared piece 2a has a length of L0. Thus, the plate member 2 is continuously sheared into sheared pieces 2a each having a length of L0 in accordance with the rotation of the shearing rollers 20 and 20. In this embodiment, since the shearing rollers 20 and 20 are provided with two pairs of shearing portions 21 and 21 at the peripheries, two shearing pieces 2a each having the same length L0 can be obtained every one rotation.

Then, the sheared piece 2a is introduced between the forwarding rollers 30 and 30 in a state in which the ridges 3 formed on the upper surface of the sheared piece 2a are engaged with the grooves of the peripheral surface of the upper forwarding roller 30 and the grooves 4 formed on the lower surface of the sheared piece 2a are engaged with the ridges of the peripheral surface of the lower forwarding roller 30. As a result, the sheared piece 2a is pinched by and between the peripheral surfaces of the forwarding rollers 30 and 30 and transferred by the rotation driving force of the forwarding rollers 30 and 30.

Then, the sheared piece 2a is introduced between the transferring rollers 40 and 40 in a state in which the ridges 3 formed on the upper surface of the sheared piece 2a are engaged with the grooves of the peripheral surface of the upper transferring roller 40 and the grooves 4 formed on the lower surface of the sheared piece 2a are engaged with the ridges of the peripheral surface of the lower transferring roller 40. As a result, the sheared piece 2a is pinched by and between the peripheral surfaces of the transferring rollers 40 and 40 and transferred to the stacker 50 by the rotation driving force of the transferring rollers 40 and 40. Then, the sheared piece 2a is piled up on the platform 51 by the stacker 50.

In this embodiment, the distance L2 (see FIG. 1) between the rotational center of the shearing roller 20 and that of the forwarding roller 30 along the plate member traveling direction is set so as to fall within the range of from L0 to (L0-15) mm. Accordingly, when the sheared piece 2a is moved from the shearing rollers 20 to the forwarding rollers 30, the sheared piece 2a is laid on both the shearing roller 20 and the forwarding roller 30. Furthermore, the distance L3 (see FIG. 1) between the rotational center of the forwarding roller 30 and that of the transferring roller 40 along the plate member traveling direction is set so as to fall within the range of from L0 to (L0-15) mm. Accordingly, when the sheared piece 2a is moved from the forwarding rollers 30 to the transferring rollers 40, the sheared piece 2a is laid on both the forwarding roller 30 and the transferring roller 40. Accordingly, the sheared piece 2a is smoothly transferred to the stacker 50 without falling down from the shearing apparatus 1.

As a result, with this shearing apparatus 1 having the aforementioned structure, since the plate member 2 is always sheared into the length L0 to thereby obtain a sheared piece 2a with a uniform length. Furthermore, since this shearing apparatus 1 can shear the plate member 2 without causing a remaining piece, there is an advantage that the yielding efficiency of sheared piece 2a is high.

Furthermore, since the shearing speed of the plate member 2 is determined by the rotation speed of the shearing rollers 20, the shearing speed can be increased by increasing the rotating speed of the shearing rollers 20. Furthermore, in this embodiment, as mentioned above, since the shearing rollers 20 and 20 are provided with a pair of shearing portions 21 and 21 on the peripheries thereof at intervals in the circumferential direction, two sheared pieces 2a and 2a can be obtained every one rotation of the shearing roller 20. Accordingly, with this shearing apparatus 1, the plate member 2 can be sheared at extremely high shearing speed.

Furthermore, in this shearing apparatus 1, as shown in FIG. 6, the plate member 2 is pinched by and between the shearing rollers 20 and 20 and moved in a state in which the ridges 3 formed on the upper surface of the plate member 2 is engaged with the grooves 23 formed on the peripheral surface of the upper shearing roller 20 and the grooves 4 formed on the lower surface of the plate member 2 is engaged with the ridges 24 formed on the peripheral surface of the lower shearing roller 20. Accordingly, with this shearing apparatus 1, even if the plate member 2 has grooves 3 and ridges 4 on both sides, the plate member 2 can be firmly pinched by the peripheral surfaces of the shearing rollers 20 and 20 without causing deformation of the grooves and ridges. As a result, slippage of the plate member 2 which may be generated on the peripheral surface of the shearing rollers 20 can be prevented assuredly, and therefore it becomes possible to shear the plate member 2 more assuredly into a uniform length.

Furthermore, in each shearing roller 20, since the grooves 23 and the ridges 24 extend to the shearing face 21a of the shearing portion 21, even if the plate member 2 is a thin member, the plate member 2 can be sheared without causing any deformation of the shearing portion. Furthermore, as mentioned above, since it is constituted that the clearance C between the shearing portions 21 and 21 can be nearly zero at the time of engagement of the shearing portions 21 and 21, generation of burrs which may be generated at the shearing portion can be prevented or suppressed, and therefore the sheared piece 2a with an extremely beautiful sheared portion can be obtained.

Furthermore, in this shearing rollers 20, since the rising face 22a and the protruded edge 22b at the stepped portion 22 formed on the peripheral surface of the shearing roller constitute the shearing face 21a and the shearing edge 21b of the shearing portion 21, respectively, it is not necessary to provide cutters as shearing portions to the peripheral surface of the shearing rollers 20 and 20. Accordingly, the structure of the shearing rollers 20 and 20 can be simplified, and the shearing rollers 20 and 20 can be manufactured easily and cheaply. Moreover, since the shearing roller 20 is comprised of two divided members 26 and 26 equally divided at the dividing face 25 which coincides with the shearing face 21a of the shearing portion 21 and fixed with each other, the structure of the shearing rollers 20 can be further simplified, and the shearing roller 20 can be manufactured more easily and cheaply.

Furthermore, since this shearing apparatus 1 is equipped with the feeding rollers 10 and the forwarding rollers 30, the plate member 2 can be fed automatically and the sheared piece 2a can be forwarded automatically. In addition, since the transferring rollers 40 and 40 are provided at the outlet side of the forwarding rollers 30 and 30 for forwarding the sheared piece 2a to the stacker 50, the sheared piece 2a can be transferred to the stacker 50 efficiently.

Although the above explanation is directed to one embodiment of the present invention, the present invention is not limited to the aforementioned embodiment and may be changed variously.

For example, in the aforementioned embodiment, although two pairs of shearing portions 21 and 21 are provided at a certain distance on the peripheral surfaces of the pair of shearing rollers 20 and 20, in this present invention, only one pair of shearing portion 21 and 21 may be provided. Alternatively, three or four pairs of shearing portion 21 and 21 may be provided.

The followings are a brief summary of the present invention.

With the shearing apparatus of the plate member according to the first aspect of the present invention, the plate member can be sheared into a uniform length. Furthermore, the plate member can be sheared without causing any remaining piece. Furthermore, according to this shearing apparatus, since the shearing speed of the plate member can be determined by the rotation speed of the shearing rollers, by increasing the rotation speed of the shearing rollers, the shearing speed can be increased. Furthermore, since it is not always necessary to provide a feeding apparatus for feeding a plate member to the shearing rollers, or it is possible to feed the plate member with a simple feeding apparatus, the structure of the shearing apparatus can be simplified. Furthermore, in cases where plural pairs of shearing portions are provided at circumferential intervals on the peripheral surfaces of the shearing rollers, the plural sheared pieces can be obtained by one rotation of the shearing roller. Accordingly, the plate member can be sheared efficiently, and the shearing speed can be further increased.

According to the second aspect of the present invention, it becomes possible to assuredly obtain a sheared piece having a desired length.

With the shearing method of the plate member according to the third aspect of the present invention, the plate member can be sheared into a uniform length, and the plate member can be sheared without causing any remaining piece. Furthermore, by increasing the rotation speed of the shearing rollers, the shearing speed can be easily increased. Furthermore, in cases where plural pairs of shearing portions are provided at circumferential intervals on the peripheral surfaces of the shearing rollers, the shearing member can be sheared efficiently, and therefore the shearing speed can be further increased.

According to the fourth aspect of the present invention, a sheared piece having a desired length can be obtained assuredly.

The terms and expressions which have been employed herein are used as terms of description and not of limitation, and there is no intent, in the use of such terms and expressions, of excluding any of the equivalents of the features shown and described or portions thereof, but it is recognized that various modifications are possible within the scope of the invention claimed

INDUSTRIAL APPLICABILITY

The shearing apparatus of a plate member according to the first aspect of the present invention is useful as a shearing apparatus for manufacturing an inner fin to be inserted in a heat exchanging tube of a heat exchanger, or useful as a shearing apparatus for shearing a thin plate member.

The sheared piece of the plate member according to the second aspect of the present invention is useful as an inner fin to be inserted in a heat exchanging tube of a heat exchanger.

The method of shearing a plate member according to the third aspect of the present invention is useful as a shearing method which is used when manufacturing an inner fin to be inserted in a heat exchanging tube of a heat exchanger, or useful as a method for shearing a thin plate member.

The sheared piece of the plate member according to the fourth aspect of the present invention is useful as an inner fin to be inserted in a heat exchanging tube of a heat exchanger.

The invention claimed is:

1. A shearing apparatus for shearing a plate member, comprising:
a pair of shearing rollers configured to shear a plate member into a predetermined length while passing the plate member between said pair of shearing rollers,
wherein said pair of shearing rollers are rotated in opposite directions in a state that the plate member is pinched by and between said pair of shearing rollers,
wherein said pair of shearing rollers include plural pairs of shearing portions to be engaged with each other to shear the plate member, said plural pairs of shearing portions being formed on peripheral surfaces of said pair of shearing rollers and extending in an axial direction of each of said pair of shearing rollers,
wherein each of said pair of shearing rollers is constituted by a plurality of divided members formed by dividing a generally cylindrical member with a dividing surface passing an axis of the columnar member and integrally assembled overlapping with each other with said plurality of divided members shifted in a radial direction thereof, whereby each of said pair of shearing rollers is provided with a plurality of stepped portions each extending in said axial direction on said peripheral surface and arranged at intervals in a peripheral direction thereof, and
wherein a rising face and a protruded edge of said stepped portion constitute a shearing face and a shearing edge, respectively.

2. The shearing apparatus for shearing a plate member as recited in claim 1,
wherein the plate member is provided with one of a groove and a ridge extending in a moving direction of the plate member on at least one of surfaces of the plate member,
wherein one of said pair of shearing rollers disposed at a side of one of the groove and the ridge of the plate member is provided with one of a ridge and a groove on said peripheral surface, and
wherein one of said ridge and said groove of said one of said pair of shearing rollers extends in a circumferential direction thereof so as to be engaged with one of said groove and said ridge of the plate member.

3. The shearing apparatus for shearing a plate member as recited in claim 2, wherein one of said ridge and said groove of said one of said pair of shearing rollers extends to a shearing face of said shearing portion.

4. The shearing apparatus for shearing a plate member as recited in claim 2, wherein a thickness of the plate member is 0.15 mm or less.

5. The shearing apparatus for shearing a plate member as recited in claim 1, wherein at least a portion of a shearing face near a shearing edge of said shearing portion of at least one of said pair of shearing rollers is curved toward said shearing edge.

6. The shearing apparatus for shearing a plate member as recited in claim 1, further comprising a feeding apparatus configured to feed the plate member to said pair of shearing rollers, said feeding apparatus being disposed at an inlet side of said pair of shearing rollers.

7. The shearing apparatus for shearing a plate member as recited in claim 1, further comprising a forwarding apparatus configured to forward a sheared member obtained by shearing the plate member, said forwarding apparatus being disposed at an outlet side of said pair of shearing rollers.

8. The shearing apparatus for shearing a plate member as recited in claim 1, further comprising a transferring apparatus configured to transfer a sheared member obtained by shearing the plate member to a stacker, said transferring apparatus being disposed at an outlet side of said pair of shearing rollers.

9. A sheared plate member sheared by the shearing apparatus as recited in claim 1.

10. A method of shearing a plate member, comprising:
preparing a shearing apparatus equipped with a pair of shearing rollers, said pair of shearing rollers including plural pairs of shearing portions to be engaged with each other, said plural pairs of shearing portions being formed on peripheral surfaces of said pair of shearing rollers and extending in an axial direction of each of said pair of shearing rollers,
wherein each of said pair of shearing rollers is constituted by a plurality of divided members formed by dividing a generally cylindrical member with a dividing surface passing an axis of the columnar member and integrally assembled overlapping with each other with said plurality of divided members shifted in a radial direction thereof, whereby each of said pair of shearing rollers is provided with a plurality of stepped portions each extending in said axial direction on said peripheral surface and arranged at intervals in a peripheral direction thereof, and
wherein a rising face and a protruded edge of said stepped portion constitute a shearing face and a shearing edge, respectively; and
shearing the plate member by engaging said plural pairs of shearing portions in a state that the plate member is pinched by and between said pair of shearing rollers rotating in opposite directions.

11. The method of shearing a plate member as recited in claim 10, wherein the plate member is provided with one of a groove and a ridge extending in a moving direction of the plate member on at least one of surfaces of the plate member, wherein one of said pair of shearing rollers disposed at a side of one of the groove and the ridge of the plate member is provided with one of a ridge and a groove at peripheral surfaces of said one of said pair of shearing rollers, and wherein one of said ridge and said groove of said one of said pair of shearing rollers extends in a circumferential direction thereof so as to be engaged with one of said groove and said ridge of the plate member.

12. The method of shearing a plate member as recited in claim 11, wherein one of said ridge and said groove of said one of said pair of shearing rollers extends to a shearing face of said shearing portion.

13. The method of shearing a plate member as recited in claim 10, wherein a thickness of the plate member is 0.15 mm or less.

14. The method of shearing a plate member as recited in claim 10, wherein at least a portion of a shearing face near a shearing edge of said shearing portion of at least one of said pair of shearing rollers is curved toward said shearing edge.

15. The method of shearing a plate member as recited in claim 10, wherein the plate member is fed to said pair of shearing rollers by a feeding apparatus disposed at an inlet side of said pair of shearing rollers.

16. The method of shearing a plate member as recited in claim 10, wherein a sheared plate member is forwarded by a forwarding apparatus disposed at an outlet side of said pair of shearing rollers.

17. The method of shearing a plate member as recited in claim 10, wherein a sheared plate member is transferred to a stacker by a transferring apparatus disposed at an outlet side of said pair of shearing rollers.

18. A sheared plate member obtained by shearing a plate member by a method as recited in claim 10.

* * * * *

UNITED STATES PATENT AND TRADEMARK OFFICE
CERTIFICATE OF CORRECTION

| | | |
|---|---|---|
| PATENT NO. | : 7,032,485 B2 | |
| APPLICATION NO. | : 10/472484 | |
| DATED | : April 25, 2006 | |
| INVENTOR(S) | : Masayuki Tsukahara et al. | |

It is certified that error appears in the above-identified patent and that said Letters Patent is hereby corrected as shown below:

On title page, Col. 1 Item (62), please insert the following Related U.S. Application Data regarding the provisional application: --This application is a 119(e) of U.S Serial No. 60/302,707, filed July 5, 2001.--

In Column 13, line 63 (Claim 4): Change "Claim 2" to -- Claim 1--.

Signed and Sealed this

Twelfth Day of September, 2006

JON W. DUDAS
*Director of the United States Patent and Trademark Office*